United States Patent
Fiorini et al.

(10) Patent No.: US 9,810,161 B2
(45) Date of Patent: Nov. 7, 2017

(54) VARIABLE VALVE LIFT DIAGNOSTIC SYSTEMS AND METHODS USING CAM PHASER DIFFERENTIAL OIL PRESSURE

(71) Applicant: GM Global Technology Operations LLC, Detroit, MI (US)

(72) Inventors: Victor A. Fiorini, Dearborn, MI (US); Turgay Bengisu, West Bloomfield, MI (US); Pradheep C. Velusamy, Coimbatore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 298 days.

(21) Appl. No.: 14/564,462

(22) Filed: Dec. 9, 2014

(65) Prior Publication Data

US 2016/0090932 A1     Mar. 31, 2016

Related U.S. Application Data

(60) Provisional application No. 62/057,480, filed on Sep. 30, 2014.

(51) Int. Cl.
*F01L 1/344*     (2006.01)
*F02D 13/02*     (2006.01)
(Continued)

(52) U.S. Cl.
CPC ........ *F02D 13/0253* (2013.01); *F01L 1/3442* (2013.01); *F01L 13/0036* (2013.01);
(Continued)

(58) Field of Classification Search
CPC ............. F02D 13/0253; F02D 13/0219; F02D 41/221; F02D 2041/288; F01L 1/3442; F01L 1/0036; F01L 2001/34453
(Continued)

(56) References Cited

U.S. PATENT DOCUMENTS

| 5,537,961 A | 7/1996 | Shigeru et al. |
| 5,937,806 A | 8/1999 | Lyko et al. |

(Continued)

FOREIGN PATENT DOCUMENTS

| CN | 101063636 A | 10/2007 |
| CN | 102003234 A | 4/2011 |
| CN | 103016180 A | 4/2013 |

*Primary Examiner* — Hai Huynh
*Assistant Examiner* — Gonzalo Laguarda

(57) ABSTRACT

A diagnostic system for a vehicle includes a difference module, a Fourier module, and a fault module. The difference module determines pressure differences for a camshaft revolution based on differences between: first pressures within first chambers of a camshaft phaser measured during the camshaft revolution, wherein the first pressures within the first chamber control advancement of the camshaft relative to a crankshaft of an engine; and second pressures within second chambers of the camshaft phaser measured during the camshaft revolution, wherein the second pressures within the second chamber control retardation of the camshaft relative to the crankshaft of the engine. The Fourier module performs a Fourier Transform (FT) based on the pressure differences to produce FT data. The fault module, based on the FT data, selectively indicates that a fault is present in a variable valve lift mechanism that is actuated by the camshaft.

18 Claims, 8 Drawing Sheets

(51) Int. Cl.
   *F02D 41/22*   (2006.01)
   *F02D 41/00*   (2006.01)
   *F02D 41/24*   (2006.01)
   *F02D 41/14*   (2006.01)
   *F02D 41/28*   (2006.01)
   *F01L 13/00*   (2006.01)
   *F01L 1/18*    (2006.01)
   *F01L 1/24*    (2006.01)

(52) U.S. Cl.
   CPC ....... *F02D 13/0219* (2013.01); *F02D 41/221* (2013.01); *F01L 1/185* (2013.01); *F01L 1/2405* (2013.01); *F01L 2001/34426* (2013.01); *F01L 2013/111* (2013.01); *F01L 2105/00* (2013.01); *F01L 2800/11* (2013.01); *F01L 2800/12* (2013.01); *F02D 41/009* (2013.01); *F02D 41/2416* (2013.01); *F02D 2041/001* (2013.01); *F02D 2041/1432* (2013.01); *F02D 2041/228* (2013.01); *F02D 2041/288* (2013.01); *F02D 2200/024* (2013.01); *Y02T 10/18* (2013.01); *Y02T 10/40* (2013.01)

(58) Field of Classification Search
   USPC ........................................................ 701/103
   See application file for complete search history.

(56) References Cited

U.S. PATENT DOCUMENTS

| | | | |
|---|---|---|---|
| 6,196,174 B1 | 3/2001 | Wada et al. | |
| 6,691,653 B2 | 2/2004 | Denz | |
| 6,814,052 B2 | 11/2004 | Weiss et al. | |
| 6,885,976 B2 | 4/2005 | Yoshiki et al. | |
| 6,973,901 B2 | 12/2005 | Machida | |
| 7,063,057 B1 | 6/2006 | Waters et al. | |
| 7,077,082 B2 | 7/2006 | Bloms et al. | |
| 7,228,828 B2 | 6/2007 | Kagy et al. | |
| 7,246,583 B2 | 7/2007 | Cinpinski et al. | |
| 7,343,887 B2 | 3/2008 | Soejima | |
| 7,698,935 B2 | 4/2010 | Dibble et al. | |
| 7,770,562 B2 | 8/2010 | Pursifull et al. | |
| 7,783,413 B2 | 8/2010 | Cinpinski et al. | |
| 7,921,701 B2 | 4/2011 | Cinpinski et al. | |
| 8,056,516 B2 | 11/2011 | Cinpinski et al. | |
| 8,380,423 B2 | 2/2013 | Cowgill et al. | |
| 8,612,124 B2 | 12/2013 | Verdejo et al. | |
| 9,080,516 B2 | 7/2015 | Zheng et al. | |
| 2003/0213445 A1 | 11/2003 | Bloms et al. | |
| 2005/0204805 A1 | 9/2005 | Wakahara et al. | |
| 2006/0096581 A1 | 5/2006 | Pauli et al. | |
| 2007/0068474 A1 | 3/2007 | Cinpinski et al. | |
| 2007/0101959 A1 | 5/2007 | Soejima | |
| 2007/0175443 A1* | 8/2007 | Schueler | F02D 41/0085 123/402 |
| 2008/0077307 A1 | 3/2008 | Wiles | |
| 2008/0281453 A1 | 11/2008 | Kortge | |
| 2009/0048729 A1 | 2/2009 | Waters et al. | |
| 2009/0132146 A1 | 5/2009 | Dibble et al. | |
| 2009/0143963 A1 | 6/2009 | Hendriksma | |
| 2009/0222196 A1 | 9/2009 | Cinpinski et al. | |
| 2009/0312937 A1 | 12/2009 | Pfeiffer | |
| 2010/0024789 A1 | 2/2010 | Lippa et al. | |
| 2010/0042306 A1 | 2/2010 | Gauthier et al. | |
| 2010/0083640 A1* | 4/2010 | Wang | F02D 35/026 60/286 |
| 2010/0263438 A1 | 10/2010 | Bagnasco et al. | |
| 2010/0269575 A1 | 10/2010 | Cinpinski et al. | |
| 2011/0054766 A1* | 3/2011 | Cowgill | F01L 1/344 701/114 |
| 2011/0153181 A1 | 6/2011 | Bagnasco et al. | |
| 2011/0196567 A1 | 8/2011 | Wiles et al. | |
| 2013/0073178 A1 | 3/2013 | Zheng et al. | |
| 2013/0180480 A1* | 7/2013 | Rollinger | F01L 1/3442 123/90.15 |

\* cited by examiner

VARIABLE VALVE LIFT DIAGNOSTIC SYSTEMS AND METHODS USING CAM PHASER DIFFERENTIAL OIL PRESSURE

CROSS-REFERENCE TO RELATED APPLICATIONS

This application claims the benefit of U.S. Provisional Application No. 62/057,480, filed on Sep. 30, 2014. The entire disclosure of the application referenced above is incorporated herein by reference.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include an internal combustion engine that generates drive torque. An intake valve is selectively opened to draw air into cylinders of the engine. The air is mixed with fuel to form a combustion mixture. The combustion mixture is compressed within the cylinders and is combusted to drive pistons within the cylinders. An exhaust valve is selectively opened to allow exhaust gas to exit the cylinders after combustion.

A rotating cam shaft regulates the opening and closing of the intake and exhaust valves. The camshaft includes a plurality of cam lobes that rotate with the camshaft. The profile of the cam lobe determines a valve lift schedule. The valve lift schedule includes the amount of time that the valve is open (duration) and the magnitude or degree at which the valve opens (lift).

Variable valve actuation (WA) technology improves fuel economy, engine efficiency, and/or performance by modifying a valve lift event, timing, and duration as a function of engine operating conditions. Two-step WA systems include variable valve lift mechanisms such as hydraulically controlled switchable roller finger followers (SRFFs). SRFFs enable two discrete valve states (e.g., a low lift state and a high lift state) for the intake and/or exhaust valves.

SUMMARY

A diagnostic system for a vehicle includes a difference module, a Fourier module, and a fault module. The difference module determines pressure differences for a camshaft revolution based on differences between: first pressures within first chambers of a camshaft phaser measured during the camshaft revolution, wherein the first pressures within the first chamber control advancement of the camshaft relative to a crankshaft of an engine; and second pressures within second chambers of the camshaft phaser measured during the camshaft revolution, wherein the second pressures within the second chamber control retardation of the camshaft relative to the crankshaft of the engine. The Fourier module performs a Fourier Transform (FT) based on the pressure differences to produce FT data. The fault module, based on the FT data, selectively indicates that a fault is present in a variable valve lift mechanism that is actuated by the camshaft.

In further features, an interpolation module linearly interpolates between the pressure differences to generate a predetermined number of interpolated pressure differences for the camshaft revolution, and the Fourier module performs the FT based on the interpolated pressure differences.

In further features, an offsetting module offsets each of the interpolated pressure differences by a predetermined offset amount to produce the predetermined number of offset pressure differences for the camshaft revolution, and the Fourier module performs the FT based on the offset pressure differences.

In further features, an inverse Fourier module performs an inverse FT on the FT data to produce second pressure differences for the camshaft revolution, and the fault module selectively indicates that the fault is present in the variable valve lift mechanism that is actuated by the camshaft based on the second pressure differences.

In further features, the fault module identifies a maximum one of the second pressure differences for the camshaft revolution, identifies a minimum one of the second pressure differences for the camshaft revolution, and selectively indicates that the fault is present in the variable valve lift mechanism that is actuated by the camshaft based on the maximum and minimum ones of the second pressure differences.

In further features, the fault module determines a difference between the maximum one of the second pressures and a minimum one of the second pressures, determines a variation value for the camshaft revolution based on the difference, and selectively indicates that the fault is present in the variable valve lift mechanism that is actuated by the camshaft based on the variation value.

In further features, the Fourier module limits the FT data to predetermined orders and filters other orders out of the FT data.

In further features, the Fourier module limits the FT to first, second, third, fourth, fifth, and eighth order camshaft frequencies and filters other orders out of the FT data.

In further features, the fault module sets a predetermined diagnostic trouble code (DTC) in memory when the fault is present in the variable valve lift mechanism.

In further features, the fault module illuminates a malfunction indicator lamp (MIL) when the fault is present in the variable valve lift mechanism.

A diagnostic method includes determining pressure differences for a camshaft revolution based on differences between: first pressures within first chambers of a camshaft phaser measured during the camshaft revolution, wherein the first pressures within the first chamber control advancement of the camshaft relative to a crankshaft of an engine; and second pressures within second chambers of the camshaft phaser measured during the camshaft revolution, wherein the second pressures within the second chamber control retardation of the camshaft relative to the crankshaft of the engine. The diagnostic method further includes: performing a Fourier Transform (FT) based on the pressure differences to produce FT data; and, based on the FT data, selectively indicating that a fault is present in a variable valve lift mechanism that is actuated by the camshaft.

In further features, the diagnostic method further includes: linearly interpolating between the pressure differences to generate a predetermined number of interpolated pressure differences for the camshaft revolution; and performing the FT based on the interpolated pressure differences.

In further features, the diagnostic method further includes: offsetting each of the interpolated pressure differences by a predetermined offset amount to produce the predetermined number of offset pressure differences for the camshaft revolution; and performing the FT based on the offset pressure differences.

In further features, the diagnostic method further includes: performing an inverse FT on the FT data to produce second pressure differences for the camshaft revolution; and selectively indicating that the fault is present in the variable valve lift mechanism that is actuated by the camshaft based on the second pressure differences.

In further features, the diagnostic method further includes: identifying a maximum one of the second pressure differences for the camshaft revolution; identifying a minimum one of the second pressure differences for the camshaft revolution; and selectively indicating that the fault is present in the variable valve lift mechanism that is actuated by the camshaft based on the maximum and minimum ones of the second pressure differences.

In further features, the diagnostic method further includes: determining a difference between the maximum one of the second pressures and a minimum one of the second pressures; determining a variation value for the camshaft revolution based on the difference; and selectively indicating that the fault is present in the variable valve lift mechanism that is actuated by the camshaft based on the variation value.

In further features, the diagnostic method further includes limiting the FT data to predetermined orders and filtering other orders out of the FT data.

In further features, the diagnostic method further includes limiting the FT to first, second, third, fourth, fifth, and eighth order camshaft frequencies and filtering other orders out of the FT data.

In further features, the diagnostic method further includes setting a predetermined diagnostic trouble code (DTC) in memory when the fault is present in the variable valve lift mechanism.

In further features, the diagnostic method further includes illuminating a malfunction indicator lamp (MIL) when the fault is present in the variable valve lift mechanism.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A cam phaser includes a rotor that is fluidly coupled to a stator through an advancing chamber and a retarding chamber. Typically, the stator is coupled to a crankshaft using a timing chain and the rotor is bolted to a camshaft. The relative pressures of the advancing and retarding chambers may be adjusted to adjust the position of the rotor relative to the stator, and thereby advance or retard valve timing.

As the timing chain rotates the camshaft, a lobe on the camshaft engages a variable valve lift mechanism, such as a switchable roller finger follower (SRFF). In turn, the variable valve lift mechanism lifts an intake or exhaust valve to open an intake or exhaust passageway into a cylinder. The variable valve lift mechanism is switchable between two discrete valve states (e.g., a low lift state and a high lift state).

A diagnostic system and method according to the present disclosure identifies faults in the variable valve lift mechanism based on a pressure difference between the advancing and retarding chambers. The pressure difference indicates the amount of torque on the camshaft that is transferred through the variable valve mechanism.

Figure 1:
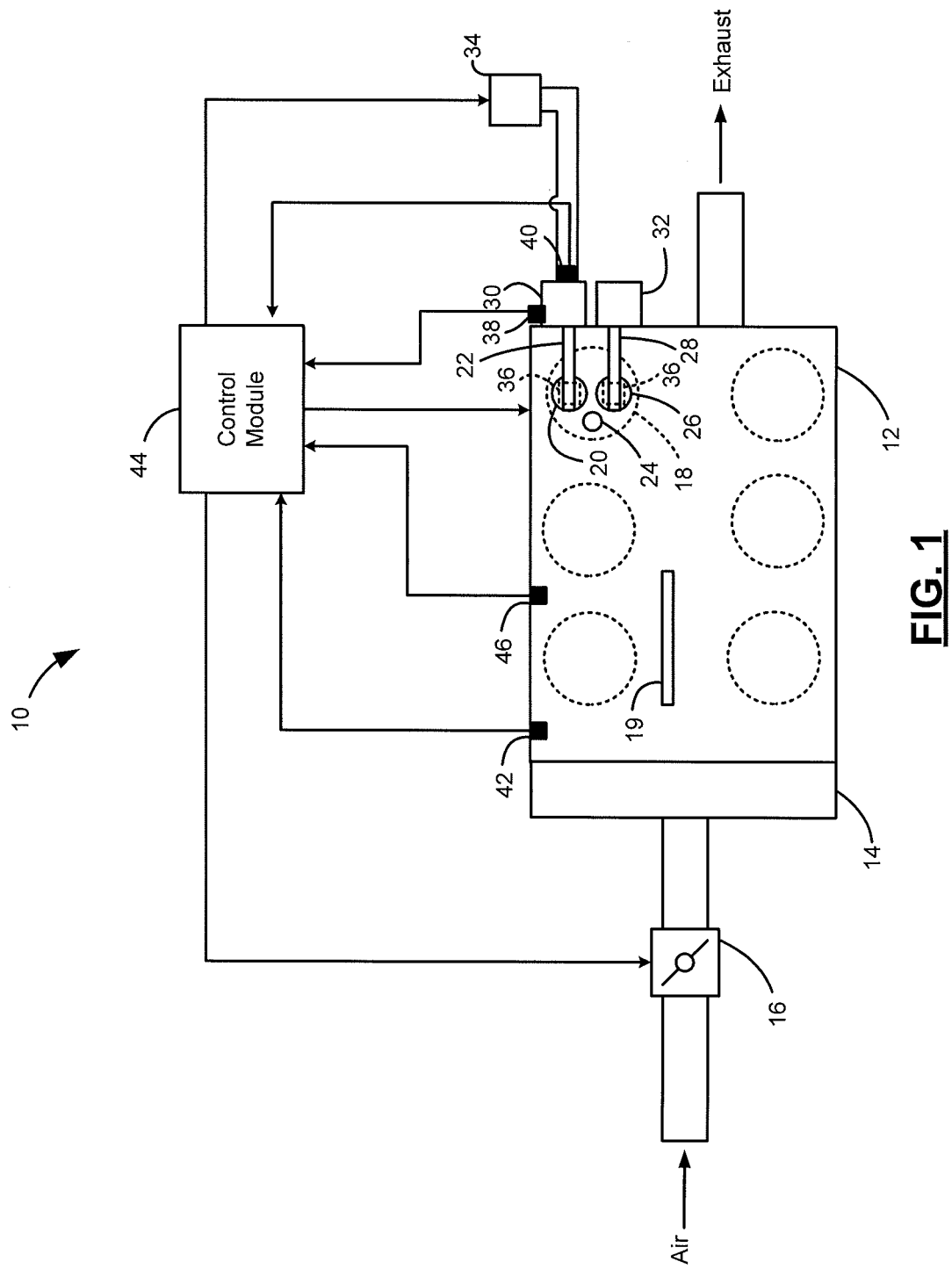
FIG. 1 is a functional block diagram of an example vehicle including a diagnostic system according to the present disclosure.

Referring to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into one or more cylinders 18. Although the engine 12 is depicted as a 6-cylinder engine, the engine 12 can include more or less of the cylinders 18. Additionally, for simplicity, components associated with only one of the cylinders 18 (i.e., the cylinder 18) are discussed below, although similar or identical components may be associated with each of the cylinders 18 and/or groups of the cylinders 18.

A fuel injector (not shown) injects fuel that is combined with the air as it is drawn into the cylinder 18 through an intake port. A fuel injector may be provided for each cylinder of the engine 12. The fuel injector may be an injector associated with an electronic or mechanical fuel injection system, a jet or port of a carburetor or another system for mixing fuel with intake air. The fuel injector is controlled to provide a desired air-to-fuel (A/F) ratio within the cylinder 18.

An intake valve 20 selectively opens and closes to enable the air/fuel mixture to enter the cylinder 18. The intake valve position is regulated by an intake camshaft 22. A piston (not shown) compresses the air/fuel mixture within the cylinder 18. A spark plug 24 may initiate combustion of the air/fuel mixture, driving the piston in the cylinder 18. A spark plug may be provided for each cylinder of the engine 12. Some types of engines, such as diesel engines, may combust air and fuel without spark plugs.

The piston drives a crankshaft 19 to produce drive torque. Combustion exhaust within the cylinder 18 is forced out an exhaust port when an exhaust valve 26 is in an open position. The exhaust valve position is regulated by an exhaust camshaft 28. The exhaust is treated in an exhaust system. Although single intake and exhaust valves 20 and 26 are illustrated, the engine 12 can include multiple intake and/or exhaust valves for each of the cylinders.

The engine system 10 includes an intake cam phaser 30 and an exhaust cam phaser 32 that respectively regulate the rotational timing of the intake and exhaust camshafts 22 and 28. The intake and exhaust cam phasers 30 and 32 can advance and retard the intake and exhaust camshafts 22 and 28, respectively. In this manner, opening and closing of the intake and exhaust valves 20 and 26 can be advanced or retarded. By regulating the opening and closing of the intake and exhaust valves 20 and 26, airflow into the cylinders, and therefore engine torque, is also regulated.

The intake cam phaser 30 is hydraulically actuated using a fluid (e.g., oil) control valve (OCV) 34. The OCV 34 controls fluid flow into and out of the intake cam phaser 30. The exhaust cam phaser 32 is also hydraulically actuated and may be actuated by the OCV 34 or another OCV.

Low lift cam lobes and high lift cam lobes are mounted to each of the intake and exhaust camshafts 22 and 28, as discussed below with reference to FIG. 2. The low lift cam lobes and high lift cam lobes rotate with the intake and exhaust camshafts 22 and 28 and are in operative contact with variable valve lift mechanisms, such as switching roller finger follower (SRFF) mechanisms 36. One of the SRFF mechanisms 36 may operate on each of the intake and exhaust valves 20 and 26. Thus, two SRFF mechanisms may be associated with each of the cylinders 18. For simplicity, only the intake cam phaser 30 and one of the SRFF mechanisms 36 are discussed below, although the exhaust cam phaser 32 and the remainder of the SRFF mechanisms 36 may be similar or identical.

The SRFF mechanism 36 provides two levels of valve lift for the intake valve 20. The two levels of valve lift include low lift and high lift and are based on the low lift cam lobes and high lift cam lobes, respectively. During low lift operation (also referred to as a low lift state), a low lift cam lobe causes the SRFF mechanism 36 to pivot to a first position and thereby open the intake valve 20 by a first amount. During high lift operation (also referred to as a high lift state), a high lift cam lobe causes the SRFF mechanism 36 to pivot to a second position and thereby opening the intake valve 20 by a second amount that is greater than the first amount.

A second OCV (not shown) controls a fluid pressure applied to control whether the intake valves served by the intake camshaft 22 are operated in the low lift state or the high lift state. More specifically, the second OCV controls fluid pressure applied to the intake camshaft 22 to control whether the low lift cam lobes or the high lift cam lobes contact the SRFF mechanisms of the intake valves of the cylinders served by the intake camshaft 22.

A camshaft position sensor 38 senses a rotational position of the intake cam phaser 30 and generates a cam phaser position signal indicating the position of the intake cam phaser 30. A pressure sensor 40 generates a cam phaser pressure signal indicating the pressure of the intake cam phaser 30, as discussed in more detail below with reference to FIG. 3. A crankshaft position sensor 42 generates a crankshaft position signal based on rotation of the crankshaft of the engine 12. A position of the crankshaft and a rotational speed of the crankshaft (also referred to as an engine speed) can be determined based on the crankshaft position signal.

A control module 44 controls the engine 12 based on input received from the camshaft position sensor 38, the pressure sensor 40, and the crankshaft position sensor 42. The control module 44 may control the engine 12 further based on input from other sensors 46 including, but not limited to, oxygen sensors, engine coolant temperature sensors, mass airflow sensors, accelerator pedal position sensors, brake pedal position sensors, and other types of sensors.

The control module 44 diagnoses faults in the SRFF mechanisms 36 based on the input received from the pressure sensor 40. Faults in SRFF mechanisms include SRFF mechanisms that are stuck or operate in a different state than commanded. The control module 44 may take one or more remedial actions (e.g., limiting engine speed) when a fault is diagnosed in one or more SRFF mechanisms. While the example of the SRFF mechanisms 36 is provided, the present application is also applicable to diagnosing faults in other types of variable valve lift (VVL) mechanisms.

Figure 2:
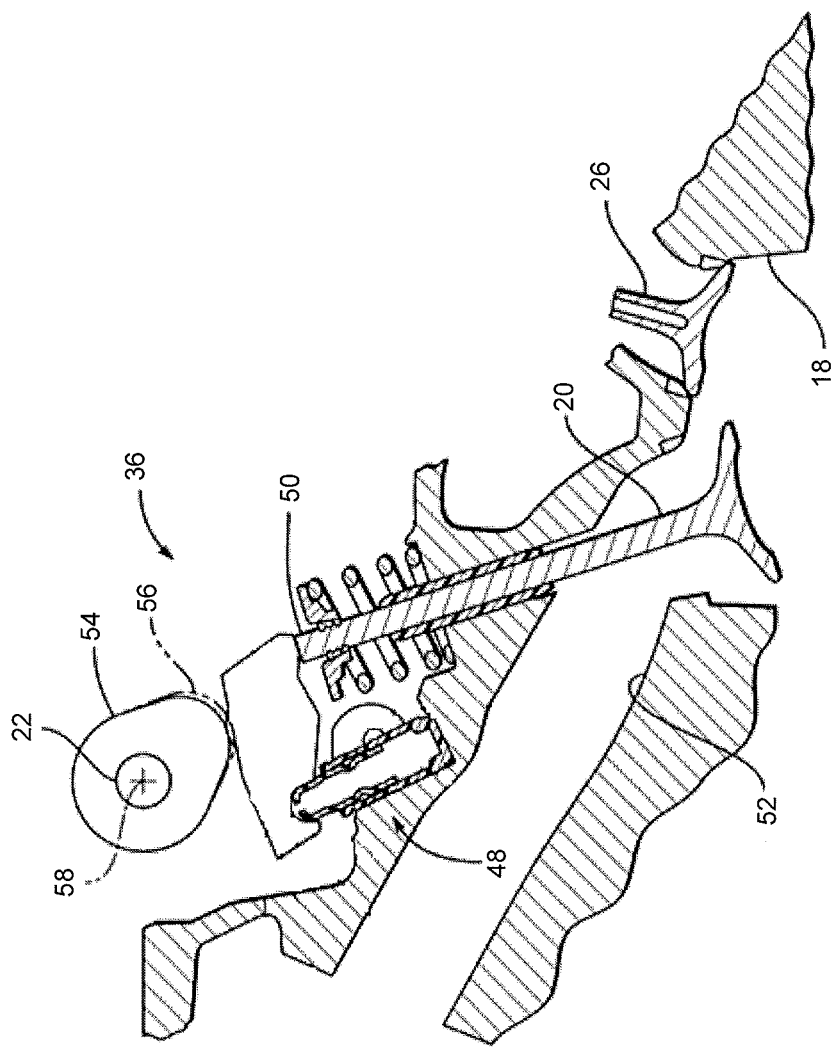
FIG. 2 is a sectional view of an example hydraulic lift mechanism according to the present disclosure.

Referring to FIG. 2, the SRFF mechanism 36 that is associated with the intake valve 20 is shown in more detail. The SRFF mechanism 36 is pivotally mounted on a hydraulic lash adjuster 48 and contacts a valve stem 50 of the intake valve 20, which selectively opens and closes an inlet passage 52 to the cylinder 18. The intake valve 20 is selectively lifted and lowered in response to rotation of the intake camshaft 22 on which multiple cam lobes (e.g. a low lift cam lobe 54 and a high lift cam lobe 56) are mounted. The intake camshaft 22 rotates about an intake camshaft axis 58. Although the example embodiment describes the SRFF mechanism 36 operating on the intake valve 20, an SRFF mechanism may operate similarly on the exhaust valve 26.

The control module 44 shown in FIG. 1 selectively transitions the SRFF mechanism 36 from low lift operation to high lift operation and vice versa, for example, based on an engine speed and an engine load. For example, the control module 44 may transition the SRFF mechanism 36 to the high lift state when the engine speed is greater than a predetermined speed, for example, to increase airflow into the cylinder 18.

Figure 3:
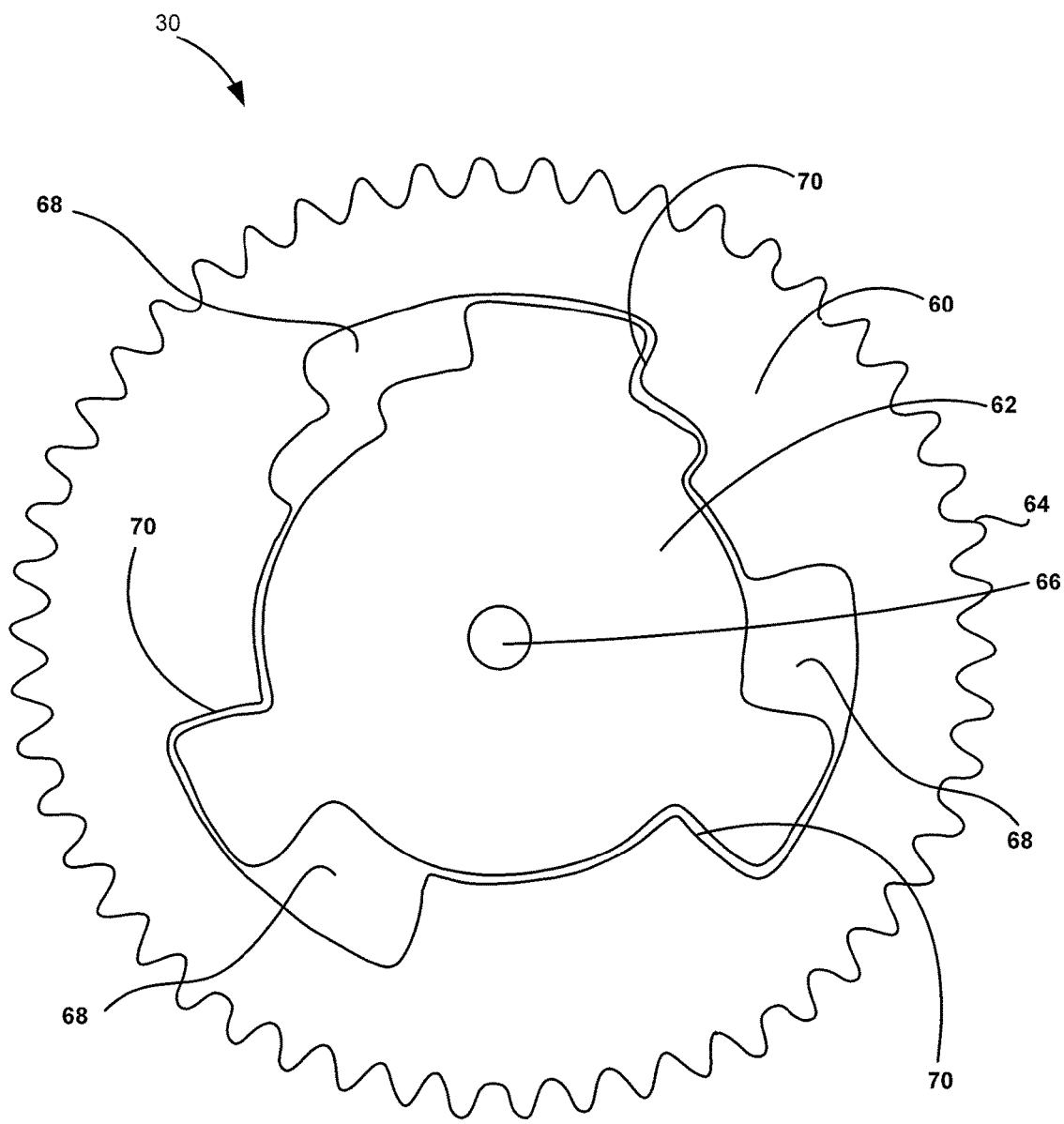
FIG. 3 is a sectional view of an example cam phaser according to the present disclosure.

Referring to FIG. 3, the intake cam phaser 30 is shown in more detail. The intake cam phaser 30 includes a stator 60 and a rotor 62. The stator 60 is coupled to the crankshaft of the engine 12 using, for example, a timing belt or chain (not shown) meshed with teeth 64 disposed around the perimeter of the stator 60. The rotor 62 is mechanically coupled to the intake camshaft 22, for example, using a bolt 66 extending through the intake camshaft 22 and the rotor 62.

The rotor 62 is fluidly coupled to the stator 60 through, for example, an advancing chamber 68 and a retarding chamber 70. In the example of FIG. 3, the intake camshaft 22 is in an advanced position.

The control module 44 controls the OCV 34 to adjust the rotational position of the rotor 62 relative to the stator 60 by adjusting the relative pressures of the advancing and retarding chambers 68 and 70. The OCV 34 adjusts the relative pressures of the advancing and retarding chambers 68 and 70 by adjusting the amount and pressure of fluid supplied to the advancing and retarding chambers 68 and 70, respectively. The intake camshaft 22 is advanced when the pressure of the advancing chamber 68 is greater than the pressure of the retarding chamber 70, rotating the rotor 62 clockwise to the position shown in the example of FIG. 3. The intake camshaft 22 is retarded when the pressure of the advancing chamber 68 is less than the pressure of the retarding chamber 70, rotating the rotor 62 counterclockwise from the position shown in the example of FIG. 3.

The control module 44 identifies faults in the SRFF mechanisms 36 based on a difference between a first pressure of fluid in the advancing chamber 68 and a second pressure of fluid in the retarding chamber 70. The pressure sensor 40 may include a first pressure sensor that measures the first pressure of fluid in the advancing chamber 68 and a second pressure sensor that measures the second pressure of fluid in the retarding chamber 70, and the control module 44 may determine the pressure difference based on a difference between the first and second pressures. While the present disclosure will be discussed using this example, the pressure sensor may alternatively include a differential pressure sensor that measures a pressure difference between the first pressure of fluid in the advancing chamber 68 and the second pressure of fluid in the retarding chamber 70. The first and second pressures may be measured, for example, in ports of the advancing and retarding chambers 68 and 70 or in ports of the OCV 34.

Figure 4:
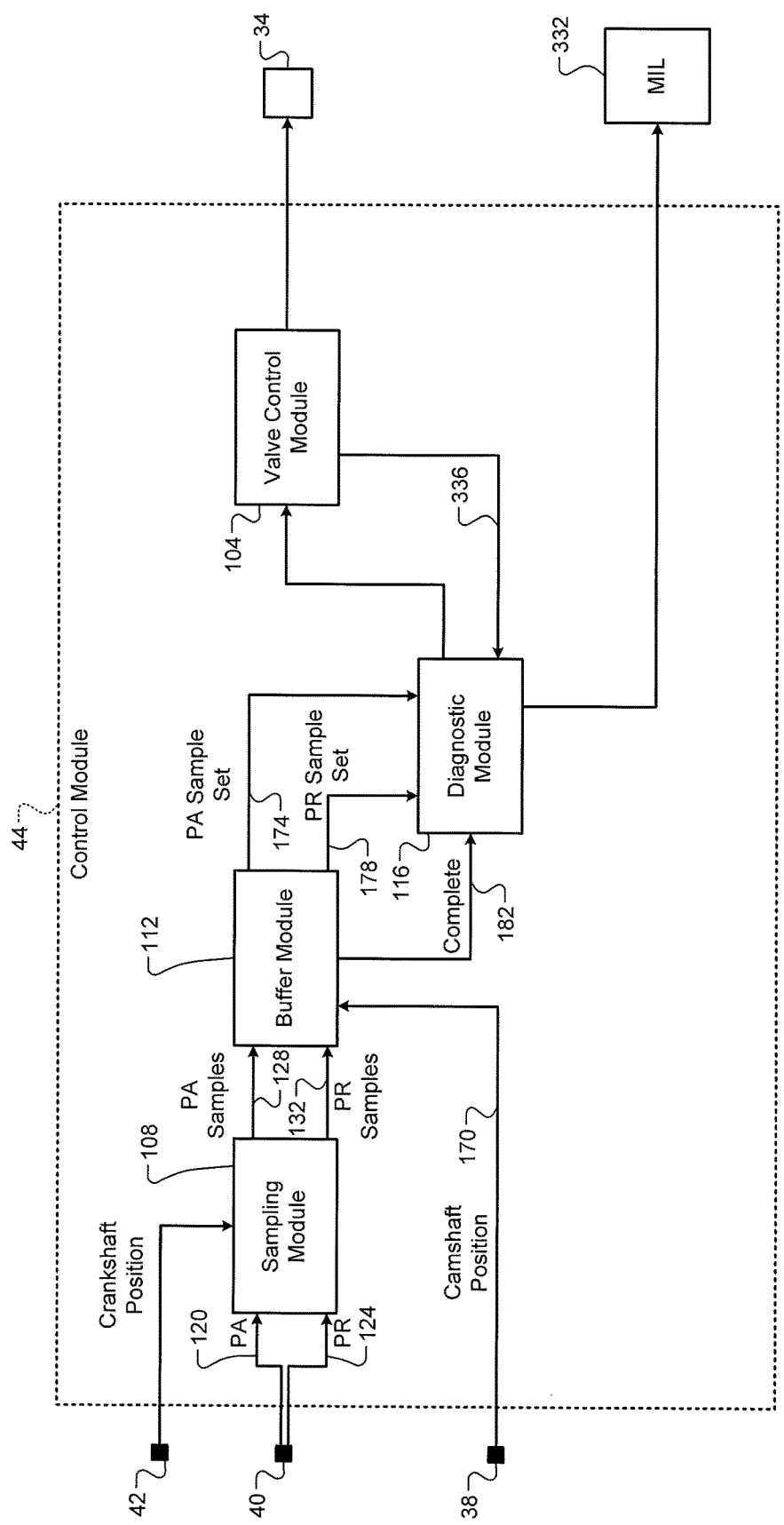
FIG. 4 is a functional block diagram of an example diagnostic system for a variable valve lift mechanism according to the present disclosure.

FIG. 4 includes a functional block diagram of an example portion of the control module 44. Referring now to FIG. 4, the control module 44 includes a valve control module 104, a sampling module 108, a buffer module 112 (see also FIG. 5), and a diagnostic module 116 (see also FIG. 6). The valve control module 104 controls the second OCV to control the lift state of the intake valves served by the intake camshaft 22. The valve control module 104 also controls the OCV 34 to control phasing of the intake camshaft 22.

The sampling module 108 samples an advancing chamber pressure signal 120 and a retarding chamber pressure signal 124 at a predetermined rate. For example, the sampling module 108 may sample the advancing and retarding chamber pressure signals 120 and 124 each predetermined amount of crankshaft rotation (e.g., every 6 degrees of crankshaft rotation). While the example of sampling the advancing and retarding chamber pressure signals 120 and 124 based on crankshaft position is provided and will be discussed, the advancing and retarding chamber pressure signals 120 and 124 may alternatively be sampled, for example, every predetermined period or based on camshaft rotation. The pressure sensor 40 generates the advancing and retarding chamber pressure signals 120 and 124 based on the pressures within the advancing and retarding chambers of the intake camshaft phaser 30, respectively. Crankshaft position may be measured using the crankshaft position sensor 42.

The sampling module 108 also digitizes the samples of the advancing chamber pressure signal 120 and the retarding chamber pressure signal 124 using an analog to digital converter (ADC). The digitized samples of the advancing chamber pressure signal 120 will be referred to as advancing chamber pressure samples (PA samples) 128, and the digitized samples of the retarding chamber pressure signal 124 will be referred to as retarding chamber pressure samples (PR samples) 132.

Figure 5:
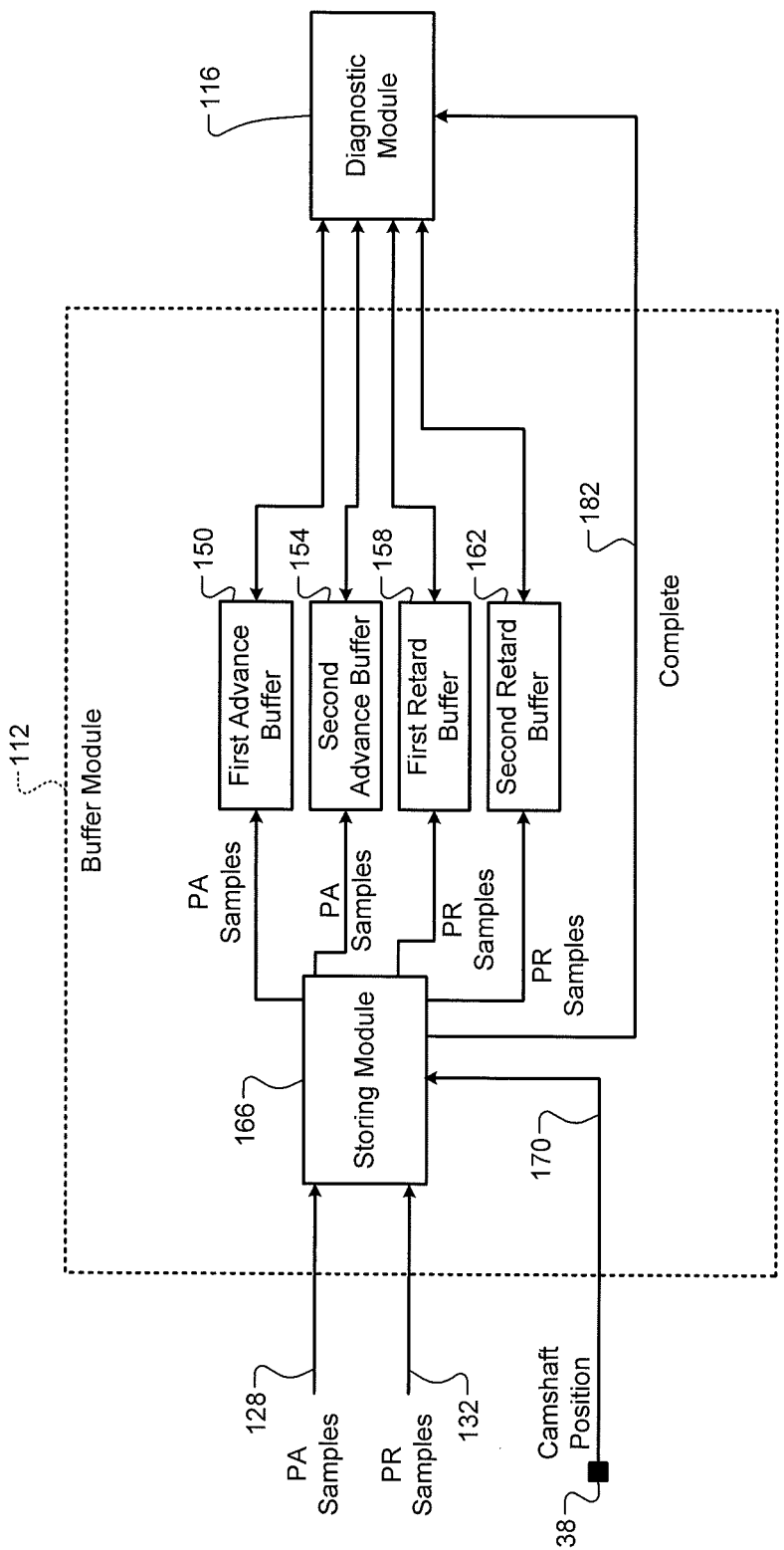
FIG. 5 is a functional block diagram of an example buffer module and an example diagnostic module according to the present disclosure.

The buffer module 112 stores the advancing and retarding chamber pressure samples 128 and 132 in respective buffers. FIG. 5 is a functional block diagram of the buffer module 112 and the diagnostic module 116.

Referring now to FIGS. 4 and 5, the buffer module 112 includes two buffers for storing the advancing chamber pressure samples 128 and two buffers for storing retarding chamber pressure samples 132. For example, in FIG. 5, the buffer module 112 includes first and second advance buffers 150 and 154 for storing the advancing chamber pressure samples 128 and includes first and second retard buffers 158 and 162 for storing the retarding chamber pressure samples 132.

A storing module 166 receives the advancing and retarding chamber pressure samples 128 and 132 and selectively stores the samples in the buffers. More specifically, the storing module 166 stores the advancing chamber pressure samples 128 obtained during a first complete revolution of the intake camshaft 22 in the first advance buffer 150. The storing module 166 also stores the retarding chamber pressure samples 132 obtained during that first complete revolution of the intake camshaft 22 in the first retard buffer 158. Advancing and retarding chamber pressure samples taken at the same time are stored in corresponding entries of the buffers, and the samples are stored in the order in which they are obtained. The storing module 166 identifies revolutions of the intake camshaft 22 using an intake camshaft position signal 170 measured using the intake camshaft position sensor 38.

The storing module 166 stores the advancing chamber pressure samples 128 obtained during a second revolution of the intake camshaft 22 in the second advance buffer 154. The storing module 166 also stores the retarding chamber pressure samples 132 obtained during that second revolution of the intake camshaft 22 in the second retard buffer 162. The second revolution of the intake camshaft 22 is a next revolution following the first revolution.

For a third revolution of the intake camshaft 22 that follows the second revolution, the storing module 166 switches back to storing the advancing and retarding chamber pressure samples 128 and 132 in the first advance and retard buffers 150 and 158, respectively. This process of switching which set of buffers is used to store the pressure samples continues for each consecutive camshaft revolution.

When the first revolution of the intake camshaft 22 is complete, the diagnostic module 116 obtains the samples stored in the first advance and retard buffers 150 and 158. The diagnostic module 116 obtains the samples stored in the second advance and retard buffers 154 and 162 when the second revolution of the intake camshaft 22 is complete. This process continues for later camshaft revolutions.

The samples obtained from one of the first and second advance buffers 150 and 154 after completion of a revolution of the intake camshaft 22 will be referred to as an advancing chamber pressure sample set 174 (see FIG. 4). The samples obtained from the corresponding one of the first and second retard buffers 158 and 162 after completion of that revolution of the intake camshaft 22 will be referred to as a retarding chamber pressure sample set 178 (see FIG. 4).

The storing module 166 may generate a complete signal 182 each time a revolution of the intake camshaft 22 is completed. The diagnostic module 116 may obtain the advancing and retarding chamber pressure sample sets 174 and 178 when the complete signal 182 is generated. The buffers 150-162 include a predetermined number of entries that is greater than a maximum number of times that the advancing and retarding chamber pressure signals 120 and 124 may be sampled and stored during each camshaft revolution.

Figure 6:
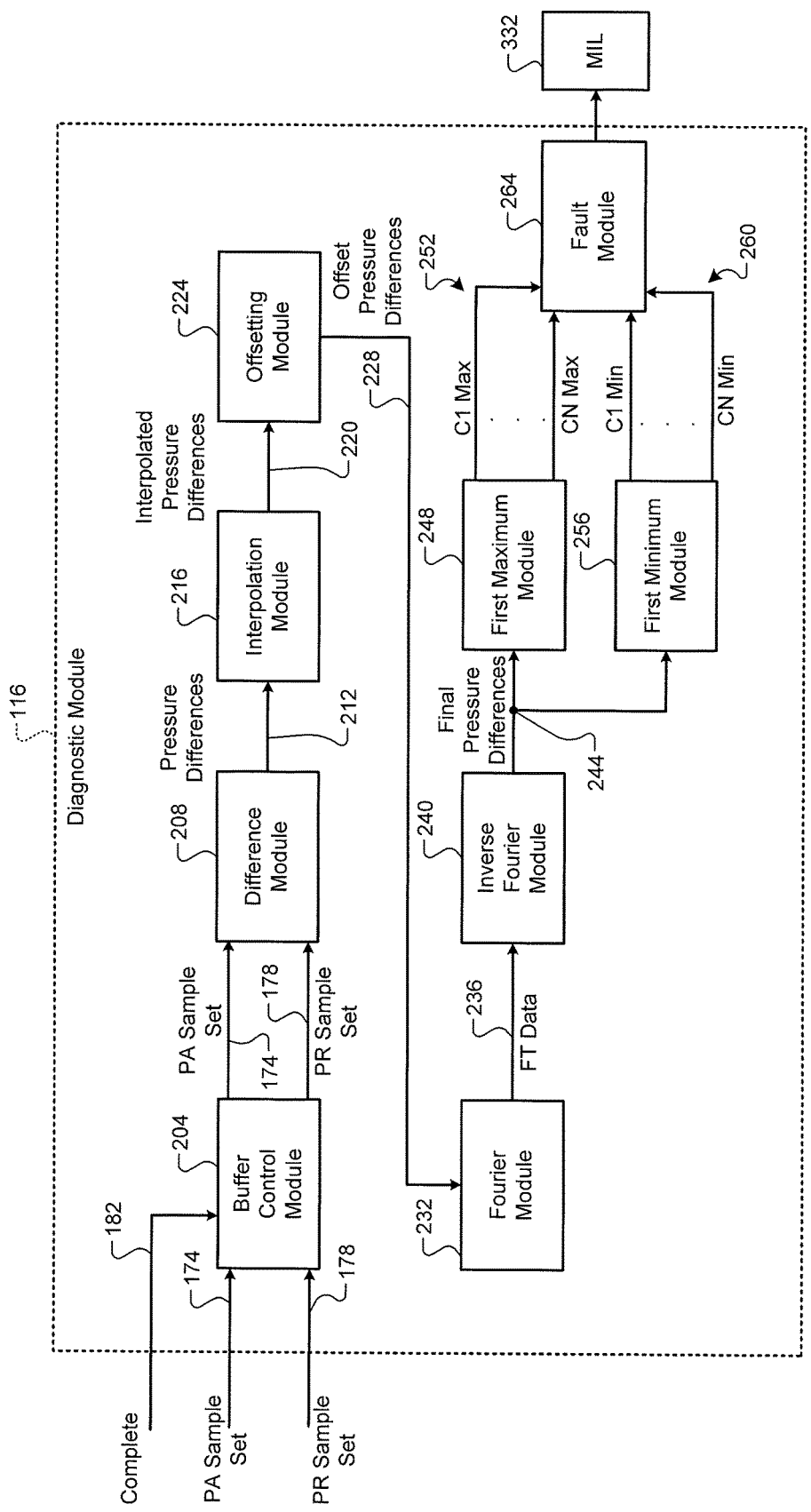
FIG. 6 is a functional block diagram of an example of the diagnostic module according to the present disclosure.

FIG. 6 includes a functional block diagram of an example implementation of the diagnostic module 116. Referring now to FIGS. 4 and 6, a buffer control module 204 obtains the advancing and retarding chamber pressure sample sets 174 and 178 when the complete signal 182 is generated. After obtaining the advancing and retarding chamber pressure sample sets 174 and 178, the buffer control module 204 may clear the entries of the buffers of the buffer module 112 where the advancing and retarding chamber pressure sample sets 174 and 178 were stored. Clearing the entries of the buffers may include, for example, setting the entries of those buffers to predetermined values. The buffer control module 204 provides the advancing and retarding chamber pressure sample sets 174 and 178 to a difference module 208.

The advancing chamber pressure sample set 174 may be illustrated in matrix form as follows:

PA Set=[PA1, PA2, . . . , PAM], where PA Set is the set of advancing chamber pressure samples 174, PA1 is a first advancing chamber pressure sample stored in a first entry of an advance buffer, PA2 is a second advancing chamber pressure sample stored in a second entry of the advance buffer, and PAM is an M-th advancing chamber pressure sample stored in an M-th entry of the advance buffer. M is an integer and is equal to the predetermined size of the buffer.

The retarding chamber pressure sample set 178 may be illustrated in matrix form as follows:

PR Set=[PR1, PR2, . . . , PRM], where PR Set is the set of retarding chamber pressure samples 178, PR1 is a first retarding chamber pressure sample stored in a first entry of a retarding buffer, PR2 is a second retarding chamber pressure sample stored in a second entry of the retarding buffer, and PRM is an M-th retarding chamber pressure sample stored in an M-th entry of the retarding buffer. M is again an integer and is equal to the predetermined size of the retarding buffer.

The difference module 208 determines a set of pressure differences 212 based on differences between the samples of the advancing chamber pressure sample set 174 and the samples of the retarding chamber pressure sample set 178, respectively. For example, the difference module 208 determines a first pressure difference based on a difference between the first advancing chamber pressure sample of the advancing chamber pressure sample set 174 and the first retarding chamber pressure sample of the retarding chamber pressure sample set 178. The difference module 208 determines a second pressure difference based on a difference between the second advancing chamber pressure sample of the advancing chamber pressure sample set 174 and the second retarding chamber pressure sample of the retarding chamber pressure sample set 178. The difference module 208 determines an M-th pressure difference based on a difference between the M-th advancing chamber pressure sample of the advancing chamber pressure sample set 174 and the M-th retarding chamber pressure sample of the retarding chamber pressure sample set 178, and so on.

An interpolation module 216 generates a set of interpolated pressure differences 220 based on the set of pressure differences 212. The set of interpolated pressure differences 220 includes a predetermined number of data points, such as 128 data points. The interpolation module 216 interpolates between points of the set of pressure differences 212, for example using linear interpolation, to generate the interpolated pressure differences 220 having the predetermined number of data points for one camshaft revolution (360 degrees of camshaft rotation).

An offsetting module 224 offsets each of the interpolated pressure differences 220 by a predetermined offset value to produce a set of offset pressure differences 228. In other words, the offsetting module 224 adds or subtracts the predetermined offset value from each of the interpolated pressure differences 220. Offsetting the interpolated pressure differences 220 by the predetermined offset value moves minimum and maximum values to within respective 45 camshaft angle degree windows. The predetermined offset value is a calibrated value.

A Fourier module 232 performs a Fourier Transform (FT) based on the offset pressure differences 228 to produce FT data 236. For example, the Fourier module 232 may perform a Discrete Fourier Transform (DFT) using predetermined camshaft orders. The predetermined camshaft orders may include orders 1, 2, 3, 4, 5, and 8. Camshaft orders of 0, 6, 7, and orders higher than 8 may be omitted. In this manner, the FT data 236 may be filtered to remove (undesired) spectral components. While the example of camshaft orders is provided, crankshaft orders may be used alternatively, where the crankshaft orders are ½ of the camshaft orders due to 1 camshaft revolution corresponding to 2 crankshaft revolutions. Other examples of Fourier transforms that may be performed by the Fourier module 232 to produce the FT data 236 include a Fast Fourier Transform (FFT) and an ultra-Fast Fourier Transform (u-FFT). While the filtering is discussed as being performed by the Fourier module 232, the filtering may be performed by a filtering module (not shown) in various implementations.

An inverse Fourier module 240 performs an inverse Fourier Transform on the FT data 236 to produce a set of final pressure differences 244. For example, the inverse Fourier module 240 may perform an inverse FFT or a Fourier expansion. The set of final pressure differences 244 includes the predetermined number of data points, such as 128 data points for the revolution of the camshaft.

A first maximum module 248 determines maximum pressure differences generally indicated by 252 for the cylinders served by the intake camshaft 22, respectively, during the camshaft revolution from the final pressure differences 244. A first minimum module 256 determines minimum pressure differences 260 for the cylinders served by the intake camshaft 22, respectively, during the camshaft revolution from the final pressure differences 244.

For example, when 4 cylinders are served by the intake camshaft 22 and the final pressure differences 244 include 128 data points, based on the offsetting performed by the offsetting module 224, the maximum and minimum pressure differences 252 and 260 for a first one of the cylinders may be identified within the first 32 data points of the final pressure differences 244. The maximum and minimum pressure differences 252 and 260 for a second one of the cylinders may be identified within the second 32 data points of the final pressure differences 244 following the first 32 data points. The maximum and minimum pressure differences 252 and 260 for a third one of the cylinders may be identified within the third 32 data points of the final pressure differences 244 following the second 32 data points. The maximum and minimum pressure differences 252 and 260 for a fourth one of the cylinders may be identified within the last 32 data points of the final pressure differences 244.

Within each set of 32 data points, a cylinder's maximum pressure difference may be within the first 16 data points, and a cylinder's minimum pressure difference may be within the last 16 data points. The first minimum and maximum modules 248 and 256 may look within these windows of data points to identify the cylinders' respective maximum and minimum pressure differences 252 and 260. In various implementations, a cylinder's minimum pressure difference may be within the first 16 data points, and a cylinder's maximum pressure difference may be within the last 16 data points.

Figure 7:
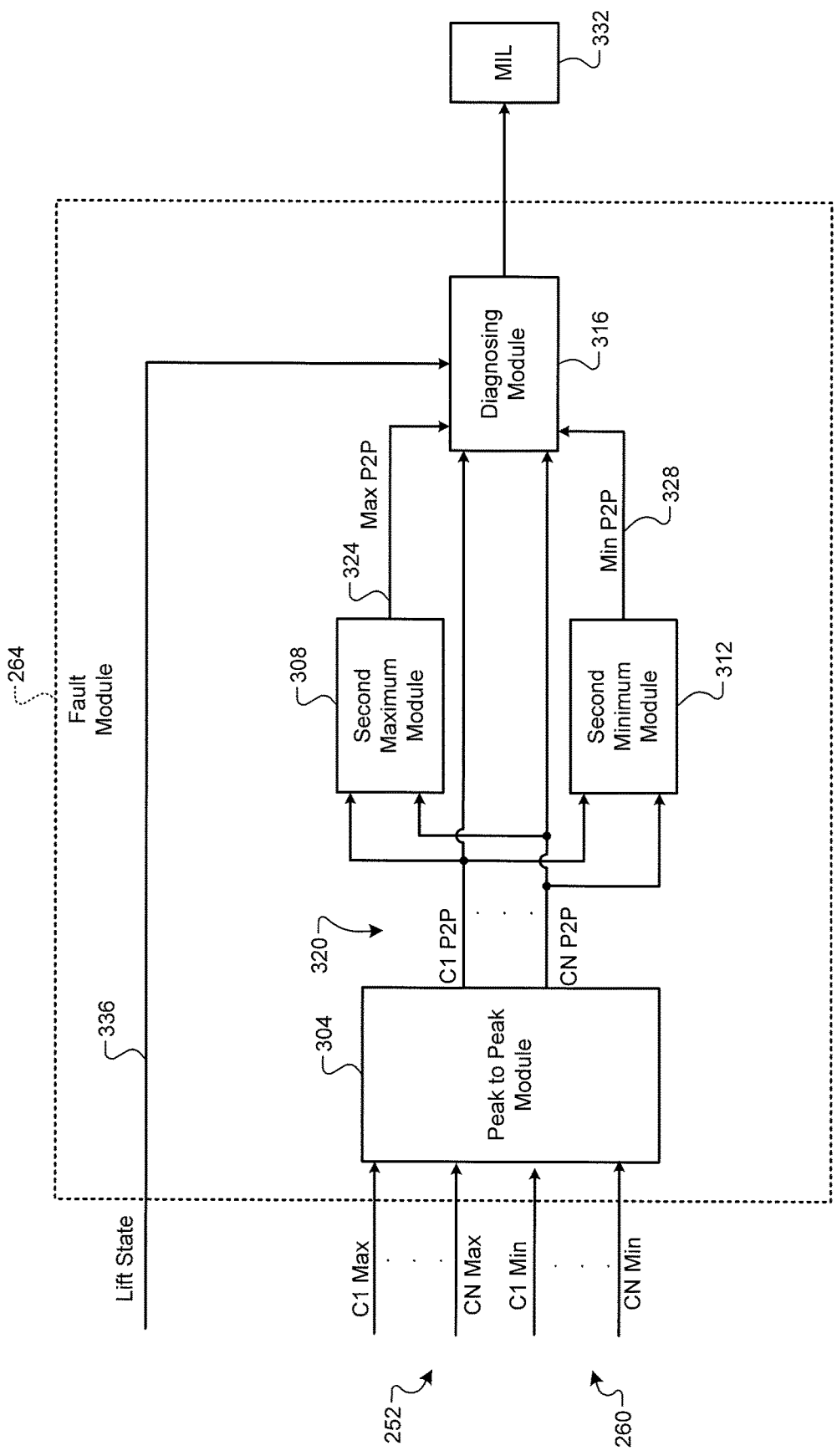
FIG. 7 is a functional block diagram of an example fault module according to the present disclosure.

A fault module 264 selectively diagnoses a fault in a cylinder's VVL mechanism based on the maximum and minimum pressure differences 252 and 260. FIG. 7 includes a functional block diagram of an example implementation of the fault module 264.

Referring now to FIGS. 6 and 7, the fault module 264 may include a peak to peak module 304, a second maximum module 308, a second minimum module 312, and a diagnosing module 316. The peak to peak module 304 determines peak to peak (P2P) differences 320 for the cylinders, respectively, served by the intake camshaft 22 based on the cylinders' respective maximum and minimum pressure differences 252 and 260. For example, the peak to peak module 304 determines a P2P difference for a first cylinder based on a difference between the first cylinder's maximum and minimum pressure differences. The peak to peak module 304 determines a P2P difference for a second cylinder based on a difference between the second cylinder's maximum and minimum pressure differences, and so on.

The second maximum module 308 compares the P2P differences 320 and determines a maximum (i.e., largest) one of the P2P differences 320 for the camshaft revolution. The second maximum module 308 outputs the maximum one of the P2P differences 320 for the camshaft revolution as maximum difference 324.

The second minimum module 312 also compares the P2P differences 320. The second minimum module 312 determines a minimum (i.e., smallest) one of the P2P differences 320 for the camshaft revolution. The second minimum module 312 outputs the minimum one of the P2P differences 320 for the camshaft revolution as minimum difference 328.

The diagnosing module 316 diagnoses whether a stuck VVL mechanism fault is present based on the maximum and minimum differences 324 and 328 for the camshaft revolution. The presence of a stuck VVL mechanism fault indicates that between 1 and less than all of the cylinders' included a VVL mechanism that did not operate in the proper lift state.

The diagnosing module 316 diagnoses that a stuck VVL mechanism fault has occurred when a variation value is greater than a predetermined value. The diagnosing module 316 determines the variation value based on the minimum and maximum differences 324 and 328. For example, the diagnosing module 316 may determine the variation value using the following relationship:

$$\text{Variation} = \frac{\text{Max} - \text{Min}}{\text{Max}},$$

where Variation is the variation value, Max is the maximum difference 324, and Min is the minimum difference 328. In various implementations, the diagnosing module 316 may require that at least X number of the variation values determined for X camshaft revolutions during the last Y consecutive camshaft revolutions of operation in the same lift state before diagnosing a stuck VVL mechanism fault.

The diagnosing module 316 may take one or more remedial actions when a stuck VVL mechanism fault is diagnosed and/or when the variation value of a camshaft revolution is greater than the predetermined value. For example, the diagnosing module 316 may illuminate a malfunction indicator lamp (MIL) 332 and set a predetermined diagnostic trouble code (DTC) in memory when the stuck VVL mechanism fault is diagnosed. The diagnosing module 316 may take one or more other remedial actions additionally or alternatively when the stuck VVL mechanism fault is diagnosed, such as limiting the engine speed to a predetermined maximum speed and/or commanding operation of all of the VVL mechanisms in the appropriate lift state or the low lift state.

When the variation value is greater than the predetermined value, the diagnosing module 316 may determine which one or more cylinders have the stuck VVL mechanism(s). The diagnosing module 316 determines whether a cylinder had a stuck VVL mechanism during a camshaft revolution based on the cylinder's peak to peak (P2P) difference 320 during the camshaft revolution. During operation in the high lift state, the diagnosing module 316 determines whether a cylinder had a stuck VVL mechanism during a camshaft revolution based on the cylinder's P2P difference 320 for the camshaft revolution and the maximum difference 324 for the camshaft revolution. For example, the diagnosing module 316 may determine that a cylinder had a stuck VVL mechanism during a camshaft revolution when a second variation value determined for the cylinder is greater than a second predetermined value. The diagnosing module 316 determines the second variation value for the cylinder, for example, using the relationship:

$$\text{Variation 2} = \frac{\text{Max} - P2P_i}{\text{Max}},$$

where Variation 2 is the second variation value for the i-th cylinder during the camshaft revolution, Max is the maximum difference 324 during the camshaft revolution, and $P2P_i$ is the P2P difference 320 of the i-th cylinder during the camshaft revolution. The diagnosing module 316 determines that a cylinder's VVL mechanism operated in the proper lift state when the cylinder's second variation value is less than the second predetermined value. The diagnosing module 316 performs this diagnosis for each of the cylinders (i.e., i=1, . . . N, where N is the number of cylinders served by the intake camshaft 22).

During operation in the low lift state, the diagnosing module 316 determines whether a cylinder had a stuck VVL mechanism during a camshaft revolution based on the cylinder's P2P difference 320 for the camshaft revolution, the maximum difference 324 for the camshaft revolution, and the minimum difference 328 for the camshaft revolution. For example, the diagnosing module 316 may determine that a cylinder had a stuck VVL mechanism during a camshaft revolution and operation in the low lift state when a third variation value determined for the cylinder is greater than a third predetermined value. The diagnosing module 316 determines the third variation value for the cylinder, for example, using the relationship:

$$\text{Variation 3} = \frac{P2P_i - \text{Min}}{\text{Max}},$$

where Variation 3 is the third variation value for the i-th cylinder during the camshaft revolution, Max is the maximum difference 324 during the camshaft revolution, $P2P_i$ is the P2P difference 320 of the i-th cylinder during the camshaft revolution, and Min is the minimum difference 328 during the camshaft revolution. The diagnosing module 316 determines that a cylinder's VVL mechanism operated in the proper lift state when the cylinder's third variation value is less than the third predetermined value. The diagnosing module 316 performs this diagnosis for each of the cylinders (i.e., i=1, . . . N, where N is the number of cylinders served by the intake camshaft 22). The diagnosing module 316 may store an indicator of the cylinder(s) that had VVL mechanism(s) that did not operate in the proper lift state. The valve control module 104 may indicate whether operation is in the high lift state or the low lift state via a lift signal 336.

Figure 8:
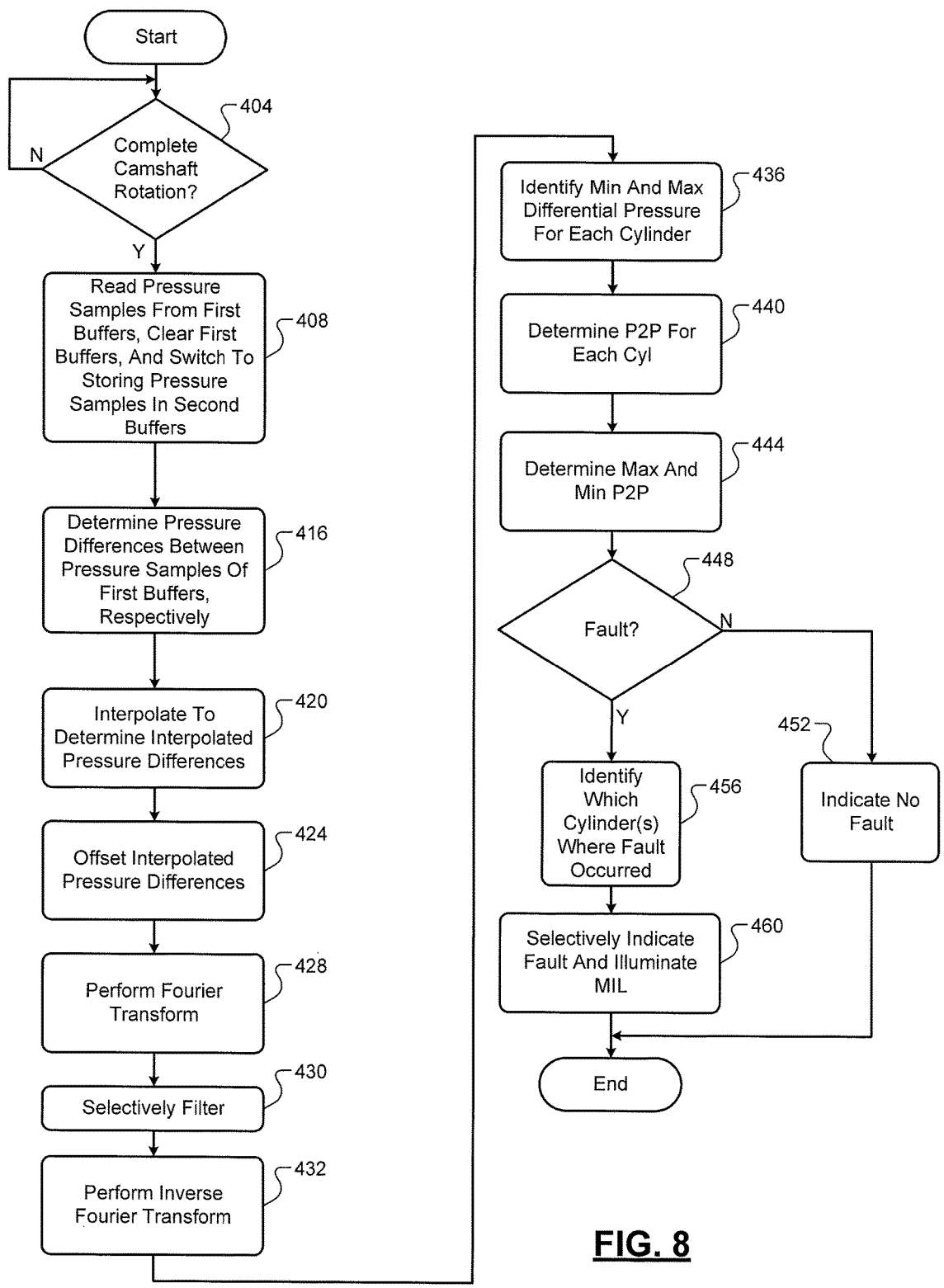
FIG. 8 is a flowchart depicting an example method of diagnosing a stuck variable valve lift mechanism according to the present disclosure.

FIG. 8 is a flowchart depicting an example method of diagnosing a stuck VVL mechanism fault. As discussed above, the sampling module 108 samples the advancing chamber pressure signal 120 and the retarding chamber pressure signal 124 at a predetermined rate, such as every predetermined amount of crankshaft rotation. The sampling module 108 samples the signals 120 and 124 concurrently with FIG. 8.

Control begins at 404 where the storing module 166 determines whether one revolution of the intake camshaft 22 (i.e., 360 degrees of intake camshaft revolution) is complete. If 404 is true, control continues with 408. If 404 is false, control remains at 404.

For ease of illustration, the storing module 166 will be assumed to be storing the advancing chamber pressure samples 128 and the retarding chamber pressure samples 132 in the first advance and retard buffers 150 and 158, respectively, when control begins. At 408, the storing module 166 switches to storing the advancing and retarding chamber pressure samples 128 and 132 in the second advance and retard buffers 154 and 162, respectively. When the storing module 166 is storing the samples 128 and 132 in the second advance and retard buffers 154 and 162, respectively, when control begins, the storing module 166 switches to storing the samples 128 and 132 in the first advance and retard buffers 150 and 158, respectively.

Also at 408, the buffer control module 204 retrieves the set of advancing chamber pressure samples 174 stored in the first advance buffer 150 and the set of retarding chamber pressure samples 178 stored in the first retard buffer 158. The buffer control module 204 may clear the entries of the first advance and retard buffers 150 and 158 after the sets of advancing and retarding pressure samples 174 and 178 have been read.

The difference module 208 determines the set of pressure differences 212 at 416 based on differences between the advancing chamber pressure samples 174 and the retarding chamber pressure samples 178, respectively. The interpolation module 216 interpolates between the pressure differences 212 to produce the set of interpolated pressure differences 220 having the predetermined number of data points at 420.

At 424, the offsetting module 224 offsets each of the interpolated pressure differences 220 by the predetermined offset value. The Fourier module 232 performs a Fourier transform on the offset pressure differences 228 at 428. The Fourier module 232 or the filter module filters the FT data 236 at 430 to selectively remove spectral components from the FT data 236. For example, the FT data 236 may be filtered to include only the predetermined camshaft orders of 1, 2, 3, 4, 5, and 8, and camshaft orders of 0, 6, 7, and orders higher than 8 may be removed. At 432, the inverse Fourier module 240 performs, for example, an inverse Fourier transform or a Fourier expansion on the (filtered) FT data 236 to produce the set of final pressure differences 244 for the camshaft revolution.

At 436, the first maximum and minimum modules 248 and 256 determine the maximum and minimum pressure differences 252 and 260 for the cylinders, respectively, during the camshaft revolution. The peak to peak module 304 determines the P2P differences 320 for the cylinders and the camshaft revolution at 440 based on differences between the cylinders' maximum and minimum pressure differences 252 and 260, respectively.

At 444, the second maximum module 308 identifies the maximum one of the maximum pressure differences 252 and the second minimum module 312 identifies the minimum one of the minimum pressure differences 260. The diagnosing module 316 determines whether a stuck VVL mecha-nism fault is present at 448. For example, the diagnosing module 316 determines a variation value for the camshaft revolution based on the maximum and minimum differences 324 and 328 for the camshaft revolution and determines whether a stuck VVL mechanism fault is present based on the variation value. If 448 is false, the diagnosing module 316 may selectively indicate that a stuck VVL mechanism fault is not present at 452, and control may end. In various implementations, one or more other diagnostics may be performed before indicating that a stuck VVL mechanism fault is not present. If 448 is true, control continues with 456.

The diagnosing module 316 determines which one or more cylinders had the stuck VVL mechanism(s) during the camshaft revolution at 456. The diagnosing module 316 determines whether a cylinder had a stuck VVL mechanism during a camshaft revolution based on the cylinder's peak to peak (P2P) difference 320 during the camshaft revolution. During operation in the high lift state, the diagnosing module 316 determines whether a cylinder had a stuck VVL mechanism during a camshaft revolution and operation in the high lift state based on the cylinder's P2P difference 320 for the camshaft revolution and the maximum difference 324 for the camshaft revolution. During operation in the low lift state, the diagnosing module 316 determines whether a cylinder had a stuck VVL mechanism during the camshaft revolution based on the cylinder's P2P difference 320 for the camshaft revolution, the maximum difference 324 for the camshaft revolution, and the minimum difference 328 for the camshaft revolution.

At 460, the diagnosing module 316 indicates that the stuck VVL mechanism fault is diagnosed. For example, the diagnosing module 316 may illuminate the MIL 332 and set a predetermined diagnostic trouble code (DTC) in memory when the stuck VVL mechanism fault is diagnosed. The predetermined DTC indicates the presence of a stuck VVL mechanism fault. The diagnosing module 316 may take one or more other remedial actions additionally or alternatively when the stuck VVL mechanism fault is diagnosed, such as limiting the engine speed to the predetermined maximum speed and/or commanding operation of all of the VVL mechanisms in the appropriate or low lift state. While the example of FIG. 8 is shown as ending after 452 and 460, FIG. 8 may be performed iteratively at a predetermined rate or control may return to 404.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A diagnostic system for a vehicle, comprising:
a difference module that determines pressure differences for a camshaft revolution based on differences between:
first pressures within a first chamber of a camshaft phaser measured at a plurality of times during the camshaft revolution using a pressure sensor, wherein the first pressures within the first chamber control advancement of the camshaft relative to a crankshaft of an engine; and
second pressures within a second chamber of the camshaft phaser measured at the plurality of times during the camshaft revolution using the pressure sensor, wherein the second pressures within the second chamber control retardation of the camshaft relative to the crankshaft of the engine;
a Fourier module that performs a Fourier Transform (FT) based on the pressure differences to produce FT data; and
a fault module that, based on the FT data, selectively indicates that a fault is present in a variable valve lift mechanism that is actuated by the camshaft and that illuminates a malfunction indicator light (MIL) when the fault is present in the variable valve lift mechanism.

2. The diagnostic system of claim 1 further comprising an interpolation module that linearly interpolates between the pressure differences to generate a predetermined number of interpolated pressure differences for the camshaft revolution,
wherein the Fourier module performs the FT based on the interpolated pressure differences.

3. The diagnostic system of claim 2 further comprising an offsetting module that offsets each of the interpolated pressure differences by a predetermined offset amount to produce the predetermined number of offset pressure differences for the camshaft revolution,
wherein the Fourier module performs the FT based on the offset pressure differences.

4. The diagnostic system of claim 1 further comprising an inverse Fourier module that performs an inverse FT on the FT data to produce second pressure differences for the camshaft revolution,
wherein the fault module selectively indicates that the fault is present in the variable valve lift mechanism that is actuated by the camshaft based on the second pressure differences.

5. The diagnostic system of claim 4 wherein the fault module identifies a maximum one of the second pressure differences for the camshaft revolution, identifies a minimum one of the second pressure differences for the camshaft revolution, and selectively indicates that the fault is present in the variable valve lift mechanism that is actuated by the camshaft based on the maximum and minimum ones of the second pressure differences.

6. The diagnostic system of claim 5 wherein the fault module determines a difference between the maximum one of the second pressures and a minimum one of the second pressures, determines a variation value for the camshaft revolution based on the difference, and selectively indicates that the fault is present in the variable valve lift mechanism that is actuated by the camshaft based on the variation value.

7. The diagnostic system of claim 1 wherein the Fourier module limits the FT data to predetermined orders and filters other orders out of the FT data.

8. The diagnostic system of claim 7 wherein the Fourier module limits the FT to first, second, third, fourth, fifth, and eighth order camshaft frequencies and filters other orders out of the FT data.

9. The diagnostic system of claim 1 wherein the fault module sets a predetermined diagnostic trouble code (DTC) in memory when the fault is present in the variable valve lift mechanism.

10. A diagnostic method for a vehicle, comprising:
determining pressure differences for a camshaft revolution based on differences between:
first pressures within a first chamber of a camshaft phaser measured at a plurality of times during the camshaft revolution using a pressure sensor, wherein the first pressures within the first chamber control advancement of the camshaft relative to a crankshaft of an engine; and
second pressures within a second chamber of the camshaft phaser measured at the plurality of times during the camshaft revolution using the pressure sensor, wherein the second pressures within the second chamber control retardation of the camshaft relative to the crankshaft of the engine;
performing a Fourier Transform (FT) based on the pressure differences to produce FT data; based on the FT data, selectively indicating that a fault is present in a variable valve lift mechanism that is actuated by the camshaft; and
illuminating a malfunction indicator light (MIL) when the fault is present in the variable valve lift mechanism.

11. The diagnostic method of claim 10 further comprising:
linearly interpolating between the pressure differences to generate a predetermined number of interpolated pressure differences for the camshaft revolution; and
performing the FT based on the interpolated pressure differences.

12. The diagnostic method of claim 11 further comprising:
offsetting each of the interpolated pressure differences by a predetermined offset amount to produce the predetermined number of offset pressure differences for the camshaft revolution; and
performing the FT based on the offset pressure differences.

13. The diagnostic method of claim 10 further comprising:
performing an inverse FT on the FT data to produce second pressure differences for the camshaft revolution; and
selectively indicating that the fault is present in the variable valve lift mechanism that is actuated by the camshaft based on the second pressure differences.

14. The diagnostic method of claim 13 further comprising:
identifying a maximum one of the second pressure differences for the camshaft revolution;
identifying a minimum one of the second pressure differences for the camshaft revolution; and
selectively indicating that the fault is present in the variable valve lift mechanism that is actuated by the camshaft based on the maximum and minimum ones of the second pressure differences.

15. The diagnostic method of claim 14 further comprising:
determining a difference between the maximum one of the second pressures and a minimum one of the second pressures;
determining a variation value for the camshaft revolution based on the difference; and
selectively indicating that the fault is present in the variable valve lift mechanism that is actuated by the camshaft based on the variation value.

16. The diagnostic method of claim 10 further comprising limiting the FT data to predetermined orders and filtering other orders out of the FT data.

17. The diagnostic method of claim 16 further comprising limiting the FT to first, second, third, fourth, fifth, and eighth order camshaft frequencies and filtering other orders out of the FT data.

18. The diagnostic method of claim 10 further comprising setting a predetermined diagnostic trouble code (DTC) in memory when the fault is present in the variable valve lift mechanism.

* * * * *